US009275775B2

(12) United States Patent
Bjorklund et al.

(10) Patent No.: US 9,275,775 B2
(45) Date of Patent: Mar. 1, 2016

(54) ELECTRICAL INSULATION SYSTEM

(71) Applicant: ABB Research Ltd., Zurich (CH)

(72) Inventors: Anders Bjorklund, Vasteras (SE); Fredrik Sahlen, Vasteras (SE); Henrik Hillborg, Vasteras (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/276,749

(22) Filed: May 13, 2014

(65) Prior Publication Data

US 2014/0246221 A1 Sep. 4, 2014

Related U.S. Application Data

(63) Continuation of application No. PCT/EP2012/068328, filed on Sep. 18, 2012.

(30) Foreign Application Priority Data

Nov. 16, 2011 (EP) .................................. 11189288

(51) Int. Cl.
*H01B 7/02* (2006.01)
*H01B 3/42* (2006.01)
(Continued)

(52) U.S. Cl.
CPC ............. *H01B 7/0241* (2013.01); *B32B 27/08* (2013.01); *B32B 27/18* (2013.01); *H01B 3/301* (2013.01);
(Continued)

(58) Field of Classification Search
CPC ...... H01B 7/0241; H01B 3/302; H01B 3/421; H01B 3/306; H01B 3/40; H01B 3/301; H01B 3/305

USPC ............ 174/120 SR; 428/323, 328, 329, 413, 428/419, 423.5, 423.7, 425.9, 473.5, 475.2
See application file for complete search history.

(56) References Cited

U.S. PATENT DOCUMENTS 4,493,873 A * 1/1985 Keane .................... H01B 9/303
174/120 SR
5,061,554 A * 10/1991 Hjortsberg ............... C08K 3/22
174/110 N (Continued)

FOREIGN PATENT DOCUMENTS

EP 0356928 A1 3/1990
EP 0356929 A1 3/1990
(Continued)

OTHER PUBLICATIONS

International Preliminary Report on Patentability Application No. PCT/EP2012/068328 Completed: Feb. 17, 2014 6 pages.

(Continued)

*Primary Examiner* — Timothy Thompson
*Assistant Examiner* — Charles Pizzuto
(74) *Attorney, Agent, or Firm* — Whitmyer IP Group LLC

(57) ABSTRACT

An electrical insulation system includes a first insulation layer having a first polymer and a first filler in the form of nanoparticles, and a second insulation layer including a second polymer and a second filler in the form of either chromium oxide, $Cr_2O_3$, iron oxide, $Fe_2O_3$, or a mixture of chromium oxide and iron oxide. At least one of the insulation layers is in the form of a solid and flat sheet. An insulation system combining the first insulation layer with well dispersed nanoparticles and the second insulation layer filled with $Cr_2O_3$ particles and/or $Fe_2O_3$ particles.

15 Claims, 2 Drawing Sheets

(51) Int. Cl.
*H01B 3/40* (2006.01)
*H01B 3/30* (2006.01)
*B32B 27/08* (2006.01)
*H01B 7/28* (2006.01)
*B32B 27/18* (2006.01)

(52) U.S. Cl.
CPC ............... *H01B 3/302* (2013.01); *H01B 3/305* (2013.01); *H01B 3/306* (2013.01); *H01B 3/40* (2013.01); *H01B 3/421* (2013.01); *H01B 7/2813* (2013.01); *B32B 2307/206* (2013.01); *B32B 2457/00* (2013.01); *Y10T 428/24967* (2015.01); *Y10T 428/25* (2015.01); *Y10T 428/256* (2015.01); *Y10T 428/257* (2015.01); *Y10T 428/31511* (2015.04); *Y10T 428/31533* (2015.04); *Y10T 428/31562* (2015.04); *Y10T 428/31565* (2015.04); *Y10T 428/31609* (2015.04); *Y10T 428/31721* (2015.04); *Y10T 428/31736* (2015.04)

(56) References Cited

U.S. PATENT DOCUMENTS

| | | | | |
|---|---|---|---|---|
| 8,861,072 B2* | 10/2014 | Arsenault | ............ | G02F 1/15 359/321 |
| 2007/0129465 A1* | 6/2007 | Baran, Jr. | ............ | C08K 5/0066 523/200 |
| 2007/0199729 A1* | 8/2007 | Siegel | ............ | C08K 3/22 174/73.1 |
| 2010/0047180 A1* | 2/2010 | Zeng | ............ | A61K 33/26 424/9.32 |
| 2010/0284711 A1* | 11/2010 | Breitenbach | ............ | G03G 15/0818 399/279 |
| 2013/0099621 A1* | 4/2013 | Bjorklund | ............ | H01B 7/2813 310/208 |

FOREIGN PATENT DOCUMENTS

| | | |
|---|---|---|
| JP | S63250010 A | 10/1988 |
| JP | S64063228 A | 3/1989 |
| JP | H0331738 B2 | 2/1991 |
| JP | H11126517 A | 5/1999 |
| JP | 2008251295 A | 10/2008 |
| WO | 2011161100 A1 | 12/2011 |

OTHER PUBLICATIONS

International Search Report & Written Opinion of the International Searching Authority Application No. PCT/EP2012/068328 Completed: Jan. 29, 2013; Mailing Date: Feb. 4, 2013 8 pages.

* cited by examiner

ELECTRICAL INSULATION SYSTEM

FIELD OF THE INVENTION

The present invention relates to an electrical insulation system comprising two different insulation layers.

BACKGROUND OF THE INVENTION

It is known to provide insulation material as a sheet material i.e. in the form of a thin sheet which is then wrapped around an object to be insulated. It is also known that the sheet material comprises nanoparticle filler within a polymer matrix. For example, an electrical conductor may conventionally be insulated by wrapping around it an insulating tape comprising a nanoparticle filler within a matrix of polyester-imide (PEI), after which the tape is heated up in order to melt an adhesive applied on it and to thereby glue the tape on the conductor. This conventional insulation system is well resistant against partial discharge, this resistance being based on the nanoparticles' ability to prevent the charged particles from penetrating the insulating tape.

It is further known e.g. from EP0356929 to protect underlying parts of an insulation system against corona discharge by providing the insulation system with an electrically conducting top layer. The top layer may comprise a chromium oxide ($Cr_2O_3$) filler in a polymer matrix. The $Cr_2O_3$ filler increases the electrical conductivity on the surface of the insulation system, and this appears to mitigate the concentrated effect of a corona discharge. It is believed that the conductivity causes the effect of the corona discharge to be dissipated over a larger surface, thus reducing the detrimental effect of the same.

While the two aforementioned insulation systems, the nano-filled tape and the $Cr_2O_3$-filled top layer, both provide a satisfactory resistance against partial discharge, there is a constant desire to further improve this resistance in order to prolong the lifetime of the insulation system.

While some insulation systems are available in the form of a sheet material, there are no sheet materials available for putting together an advanced insulation system. For example, the $Cr_2O_3$-filled top layers are applied on the conductor in a complicated process during which the conductor passes multiple times through a coating bath, subsequent wiping dies or felts, and a heating device for curing the coating. This conventional coating process can therefore be implemented solely by highly specialized companies with corresponding equipment.

SUMMARY OF THE INVENTION

One object of the invention is to provide an insulation system with an improved resistance against partial discharge.

Another object of the invention is to enable anybody to apply a partial discharge resistant insulation system on an object.

These objects are achieved by a device according to the invention.

The known insulation systems with the nano-filled polymer and the $Cr_2O_3$-filled polymer have hitherto been considered as alternative and somewhat equally good solutions for the problem of partial discharge. The invention is based on the realization that when these two solutions are combined, the resulting insulation system provides an unexpectedly long lifetime which could not have been predicted from the performances of the two insulation systems alone. The combination of the two known insulation systems appears to accomplish a synergetic effect the mechanism of which is not known in detail.

The invention is further based on the realization that when an intermediate good in the form of a sheet material comprising appropriate components of an electrical insulation system is provided, it is easy to put together the insulation system without any special equipment.

According to a first aspect of the invention, there is provided an electrical insulation system comprising a first insulation layer comprising a first polymer and a first filler in the form of nanoparticles, and a second insulation layer comprising a second polymer and a second filler in the form of chromium oxide, $Cr_2O_3$, iron oxide, $Fe_2O_3$, or a mixture of chromium oxide and iron oxide. At least one of the first and the second insulation layers is in the form of a solid and flat sheet.

In an insulation system combining a first insulation layer with well dispersed nanoparticles and a second insulation layer filled with $Cr_2O_3$ particles and/or $Fe_2O_3$ particles, a synergetic effect of the two insulation layers provides an excellent shield and resistance of the insulation system against electrical discharges. A solid and flat sheet is easily manageable and it allows anybody to apply a partial discharge resistant insulation system on an object.

According to one embodiment of the invention, both the first and the second insulation layers are in the form of a solid and flat sheet. By this measure the manageability of the insulation system is further improved.

According to one embodiment of the invention, both the first and the second insulation layers are integrated into a single solid and flat sheet. By this measure the manageability of the insulation system is even further improved.

According to one embodiment of the invention, the sheet comprises an adhesive for attaching the sheet on an object to be insulated. The adhesive provides a simple means for attaching the sheet.

According to one embodiment of the invention, the first insulation layer is between the second insulation layer and the adhesive. The second insulation layer with its certain intrinsic conductivity should constitute the outermost layer in order to protect the first insulation layer against corona discharge.

According to one embodiment of the invention, each sheet has a thickness within the range of 0.01-0.4 mm, such as 0.02-0.2 mm. Such thicknesses are shown to give the sheet an appropriate flexibility and strength.

According to one embodiment of the invention, the second filler is present in an amount of 10-40% of the volume of the second insulation layer, such as 10-30% or 15-20% of the volume of the second insulation layer. Such a concentration of the second filler is shown to give the second insulation layer an acceptable resistance against corona discharge as well as acceptable mechanical properties.

According to one embodiment of the invention, the second insulation filler has an average particle size of 0.005-30 µm, such as 0.005-10 µm or 0.15-5 µm. Such particle sizes of the second filler are shown to give the second insulation layer a good resistance against corona discharge.

According to one embodiment of the invention, the second filler has a resistivity within the range of $10^4$-$10^8$ ohm m. Such a resistivity of the second filler is shown to give the second insulation layer an appropriate intrinsic conductivity and a good resistance against corona discharge.

According to one embodiment of the invention, the first filler comprises any of the following: silicon dioxide, aluminium oxide, zinc oxide, titanium dioxide, barium titanate and magnesium oxide. These fillers are shown to give the first insulation layer a good resistance against partial discharge.

According to one embodiment of the invention, the nanoparticles in the first insulation layer are present in an amount of 1-40% of the volume of the first layer. Such a concentration of nanoparticles is shown to give the first insulation layer an acceptable resistance against partial discharge as well as good mechanical properties.

According to one embodiment of the invention, the nanoparticles in the first insulation layer have an average particle size of 1-200 nm. Such sizes of the nanoparticles are shown to give the first insulation layer a good resistance against partial discharge.

According to one embodiment of the invention, the first and the second polymers comprise at least one of the following polymers: polyesters, polyesterimides, polyamideimides, polyesteramides, polyimides, polyurethanes, epoxy, polyamides and polysulfones. These polymers provide an appropriate matrix within which the first and the second fillers can be easily dispersed. Moreover, these polymers have an appropriate strength and flexibility for being turned into a thin sheet material.

According to another aspect of the invention, there is provided an electrical conductor comprising an electrical insulation system according to any of the preceding embodiments. The electrical insulation systems according to the preceding embodiments are especially suitable for being applied on electrical conductors.

According to one embodiment of the invention, the sheet is wrapped around the conductor in several turns and at least one turn overlaps the previous turn. By overlapping the turns it is ensured that no gaps are remained between subsequent turns.

BRIEF DESCRIPTION OF THE DRAWINGS

The invention will be explained in greater detail with reference to the accompanying drawings, wherein.

DETAILED DESCRIPTION OF THE INVENTION

Figure 1:
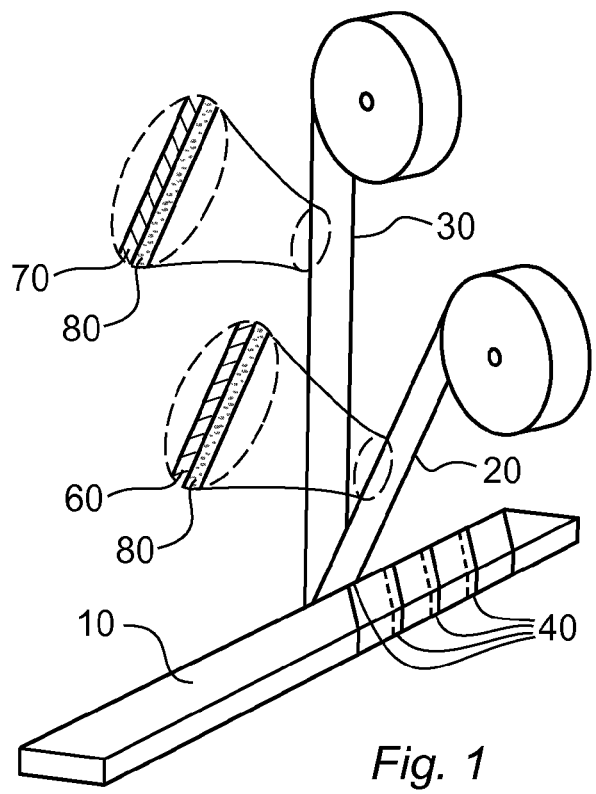
FIG. 1 shows an electrical conductor provided with an insulation system according to one embodiment of the invention.

Referring to FIG. 1, an electrical conductor 10 may be insulated by wrapping around it a first strip 20 comprising a first insulation layer 60. The first insulation layer 60 consists of a first polymer and a first filler in the form of nanoparticles. A second strip 30 comprising a second insulation layer 70 is wrapped simultaneously with the first strip 20. The second insulation layer 70 consists of a second polymer and a second filler in the form of $Cr_2O_3$. The two strips 20, 30 have equal widths, and preferably the second strip 30 covers exactly the first one. Alternatively, the electrical conductor 10 may first be wrapped with the first strip 20 alone, after what the second strip 30 alone is wrapped. The first and the second strips 20, 30 may comprise adhesive 80 for attaching the strips on the electrical conductor 10. Optionally, the adhesive may be applied on both sides of the strips. The adhesive may consist of a fluoropolymer resin comprising fluorinated ethylene propylene (FEP). Each turn overlaps the previous turn such that overlapping regions 40 are created along the joint between subsequent turns.

Figure 2:
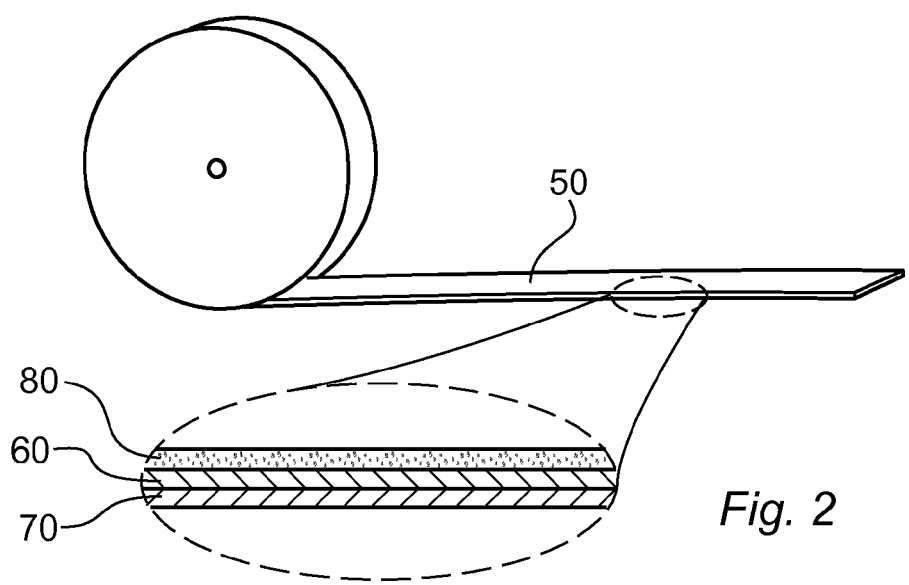
FIG. 2 shows a sheet material comprising an insulation system according to one embodiment of the invention.

Instead of consisting of two separate strips 20, 30, the first polymer, the first filler, the second polymer, and the second filler may all be integrated into a third strip 50 which may be wrapped in a single step. Such third strip 50 is illustrated in FIG. 2, and it comprises a first insulation layer 60 consisting of a first polymer and a first filler in the form of nanoparticles, a second insulation layer 70 consisting of a second polymer and a second filler in the form of $Cr_2O_3$, and an adhesive 80 for attaching the third strip 50 on an object to be insulated. In comparison with two separate strips 20, 30, the third strip 50 not only has the advantage that the wrapping is simplified. The resulting insulation system is probably also improved because wrapping of the two strips separately increases the risk of impurities and air bubbles to be trapped between the first and the second insulation layers 60, 70. These impurities and air bubbles weaken the insulation system's resistance against partial discharge.

The thickness of the first, the second and the third strips 20, 30, 50 is preferably between 0.01 mm and 0.4 mm, and even more preferably between 0.02 mm and 0.2 mm. The thickness of the first insulation layer 60 is preferably between 0.01 mm and 0.12 mm, and the thickness of the second insulation layer 70 is preferably between 0.005 mm and 0.06 mm.

Instead of $Cr_2O_3$, the second filler may in each case be iron oxide ($Fe_2O_3$), or a mixture of $Cr_2O_3$ and $Fe_2O_3$. The function of the second filler is to render the outer surface of the insulation system sufficiently conductive such that the underlying parts of the insulation system are protected against a concentrated effect of a corona discharge. To reach this effect, the second filler should have a resistivity within the range of $10^4$-$10^8$ ohm m. The second filler should furthermore be present in an amount of 10-40% of the volume of the second insulation layer 70, preferably 10-30% of the volume of the second insulation layer 70, and most preferably 15-20% of the volume of the second insulation layer 70. Moreover, the second filler should have an average particle size of 0.005-30 μm, preferably 0.005-10 μm, most preferably 0.15-5 μm.

The function of the first filler is likewise to provide protection against partial discharge, and especially to provide protection that is mechanically durable. The nanoparticles as the first filler provide the first insulation layer 60 on one hand with a good protection against partial discharge, and on the other hand with an excellent bending strength. The mechanical properties of the second insulation layer 70 are decreased with increased amount of the second filler. The two insulation layers 60, 70 therefore complement each other's weaknesses. In order to reach the good mechanical properties, the nanoparticles in the first insulation layer 60 should be present in an amount of 1-40% of the volume of the first insulation layer 60, and an average particle size of the same should be 1-200 nm. Moreover, the nanoparticles should be well dispersed into the first polymer. The first filler may comprise silicon dioxide, aluminium oxide, zinc oxide, titanium dioxide, barium titanate or magnesium oxide, or a mixture of the same.

Figure 3:
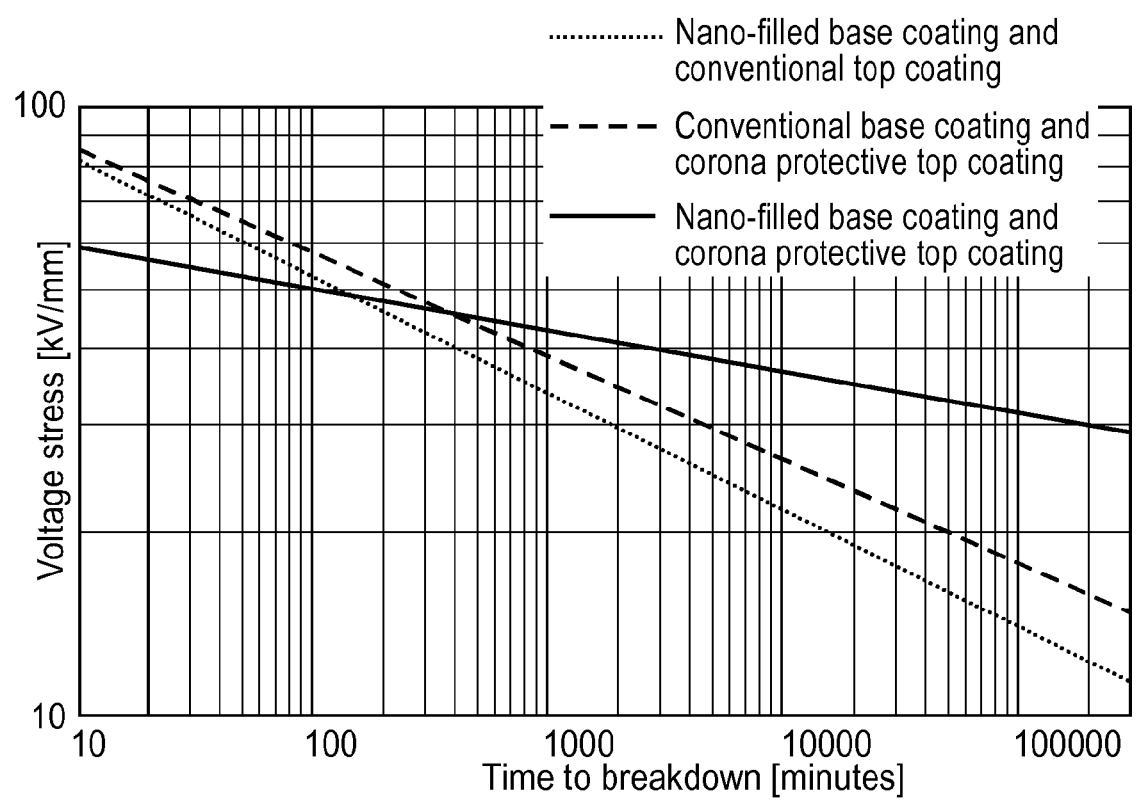
FIG. 3 shows a comparison of lifetime curves for the insulation system according to the invention and for two prior art insulation systems.

As established hereinbefore, the first and the second insulation layers are both per se known from the prior art. It appears that the two prior art solutions are based on very different principles of resisting partial discharge, and therefore the combination of the two insulation layers achieve a synergetic effect that gives surprising results. Even if the mechanism of this synergetic effect is not known in detail, the effect itself is easily measurable. FIG. 3 shows lifetime curves for the two prior art insulation systems and for the combination according to the invention. It can be seen that the combination of the nano-filled polymer and the $Cr_2O_3$-filled polymer results in a strong difference in the slope of the respective lifetime curve compared with the slopes of the lifetime curves of the two prior art insulation systems alone.

The function of the first and the second polymers is to constitute a matrix within which the particles of the first and the second fillers, respectively, can be substantially homogenously distributed. The resulting composition must also be appropriate to be turned into an easy-to-handle sheet material. The first and the second polymers may comprise at least one of the following polymers: polyesters, polyesterimides, polyamideimides, polyesteramides, polyimides, polyurethanes, epoxy, polyamides and polysulfones. The first and the second polymers may further be same polymer.

The invention is not limited to the embodiments shown above, but the person skilled in the art may, of course, modify them in a plurality of ways within the scope of the invention as defined by the claims.

What is claimed is:

1. An electrical insulation system comprising: a first insulation layer comprising a first polymer and a first filler in the form of nanoparticles; a second insulation layer comprising a second polymer and a second filler in the form of chromium oxide, $Cr_2O_3$, iron oxide, $Fe_2O_3$, or a mixture of chromium oxide and iron oxide; characterized in that at least one of the first and the second insulation layers is in the form of a solid and flat sheet.

2. The electrical insulation system according to claim 1, wherein both the first and the second insulation layers are in the form of a solid and flat sheet.

3. The electrical insulation system according to claim 1, wherein both the first and the second insulation layers are integrated into a single solid and flat sheet.

4. The electrical insulation system according to claim 1, wherein the sheet comprises an adhesive for attaching the sheet on an object to be insulated.

5. The electrical insulation system according to claim 4, wherein the first insulation layer is between the second insulation layer and the adhesive.

6. The electrical insulation system according to claim 1, wherein each sheet has a thickness within the range of 0.01-0.4 mm, such as 0.02-0.2 mm.

7. The electrical insulation system according to claim 1, wherein the second filler is present in an amount of 10-40% of the volume of the second insulation layer, such as 10-30% or 15-20% of the volume of the second insulation layer.

8. The electrical insulation system according to claim 1, wherein the second insulation filler has an average particle size of 0.005-30 μm, such as 0.005-10 μm or 0.15-5 μm.

9. The electrical insulation system according to claim 1, wherein the second filler has a resistivity within the range of $10^4$-$10^8$ ohmm.

10. The electrical insulation system according to claim 1, wherein the first filler comprises any of the following: silicon dioxide, aluminium oxide, zinc oxide, titanium dioxide, barium titanate and magnesium oxide.

11. The electrical insulation system according to claim 1, wherein the nanoparticles in the first insulation layer are present in an amount of 1-40% of the volume of the first layer.

12. The electrical insulation system according to claim 1, wherein the nanoparticles in the first insulation layer have an average particle size of 1-200 nm.

13. The electrical insulation system according to claim 1, wherein the first and the second polymers comprise at least one of the following polymers: polyesters, polyesterimides, polyamideimides, polyesteramides, polyimides, polyurethanes, epoxy, polyamides and polysulfones.

14. An electrical conductor comprising an electrical insulation system according to claim 1.

15. The electrical conductor according to claim 14, wherein the sheet is wrapped around the conductor in several turns and at least one turn overlaps the previous turn.

* * * * *